US 11,835,468 B2

(12) United States Patent
Park (10) Patent No.: US 11,835,468 B2
(45) Date of Patent: Dec. 5, 2023

(54) DEVICE AND METHOD FOR INSPECTING AIR VOID AT LEAD FILM OF BATTERY

(71) Applicant: TECH DR. CO., LTD., Seongnam-si (KR)

(72) Inventor: Young Ho Park, Seongnam-si (KR)

(73) Assignee: TECH DR. CO., LTD., Seongnam-si (KR)

( * ) Notice: Subject to any disclaimer, the term of this patent is extended or adjusted under 35 U.S.C. 154(b) by 70 days.

(21) Appl. No.: 17/826,821

(22) Filed: May 27, 2022

(65) Prior Publication Data

US 2022/0390387 A1 Dec. 8, 2022

(30) Foreign Application Priority Data

Jun. 4, 2021 (KR) .................. 10-2021-0072925

(51) Int. Cl.
*G01B 9/02* (2022.01)
*G01N 21/88* (2006.01)
*H01M 50/105* (2021.01)
*H01M 50/188* (2021.01)
(Continued)

(52) U.S. Cl.
CPC ..... *G01N 21/8851* (2013.01); *G01B 9/02091* (2013.01); *H01M 10/4285* (2013.01); *H01M 50/105* (2021.01); *H01M 50/188* (2021.01)

(58) Field of Classification Search
CPC .......... G01N 21/8851; G01N 21/4795; G01N 21/95; H01M 50/105; H01M 50/178; H01M 50/188; H01M 10/4285; G01B 9/02091; G01B 11/14; G01B 11/0675
See application file for complete search history.

(56) References Cited

U.S. PATENT DOCUMENTS 6,177,799 B1 * 1/2001 Martineau ................ G01B 7/24
324/425
2019/0064277 A1 2/2019 Cai et al.
2022/0013870 A1 * 1/2022 Kim .................... H01M 50/184

FOREIGN PATENT DOCUMENTS

| JP | 2016-170080 A | 9/2016 |
| KR | 10-2008-0019128 A | 3/2008 |
| KR | 10-2015-0045168 A | 4/2015 |

(Continued)

OTHER PUBLICATIONS

Matsumura, Yutaka et al. "TAB-Lead for Automotive Lithium-ion Batteries." SEI Technical Review • No. 88 (2019). (Year: 2019).*

*Primary Examiner* — Uzma Alam
*Assistant Examiner* — Jonathon Cook
(74) *Attorney, Agent, or Firm* — NKL LAW; Jae Youn Kim (57) ABSTRACT

Proposed are a device and a method for inspecting an air void at a lead film of a battery to simply and accurately perform total inspection of a gap between a lead film and the lead tab boundary by using an OCT, wherein an object to be inspected in which the lead film is attached to a lead tab is conveyed through a conveying device, the conveyed object is gripped and loaded to an inspection position, the object is aligned to form an OCT focus on an interface between the lead tab and the lead film of the object, a gap inspection image between the lead tab and the lead film is obtained by scanning the interface between the lead tab and the lead film by using an OCT scanner above the inspection position, and the obtained gap inspection image is analyzed, thereby determining fusion quality of the lead film.

8 Claims, 7 Drawing Sheets

(51) Int. Cl.
*G01B 9/02091* (2022.01)
*H01M 10/42* (2006.01)

(56) References Cited

FOREIGN PATENT DOCUMENTS

| | | | |
|---|---|---|---|
| KR | 10-2015-0090541 A | | 8/2015 |
| KR | 10-2000698 B1 | | 10/2019 |
| KR | 102039526 B1 | * | 11/2019 |
| KR | 10-2019-0133551 A | | 12/2019 |
| KR | 10-2020-0017089 A | | 2/2020 |
| KR | 10-2021-0009031 A | | 1/2021 |

* cited by examiner

DEVICE AND METHOD FOR INSPECTING AIR VOID AT LEAD FILM OF BATTERY

BACKGROUND OF THE INVENTION

1. Field of the Invention

The present invention relates to a device and a method for inspecting an air void at a lead film of a battery, and more particularly, to a device and a method for inspecting an air void at a lead film of a battery, in which to simply and accurately perform total inspection of a gap (air void) between a lead film, which is attached to the lead tab to prevent a leakage of electrolyte in a pouch-type lithium-ion battery and insulate the electrolyte, and the lead tab boundary by using an optical coherence tomography (OCT).

2. Description of the Related Art

In general, researches on secondary batteries rechargeable and dischargeable, unlike primary batteries that cannot be recharged, are in progress actively for the application to high-tech fields such as digital cameras, smartphones, laptops, hybrid vehicles, and electric vehicles.

Examples of the secondary battery include a nickel-cadmium battery, a nickel-metal hydride battery, a nickel-hydrogen battery, and a lithium secondary battery. Among them, the lithium secondary battery has an operating voltage of 3.2V or higher and is used as a power source for portable electronic devices or used for high-output hybrid vehicles after connected in series with a plurality of lithium secondary batteries. Compared to nickel-cadmium batteries or nickel-metal hydride batteries, the lithium secondary battery has the operating voltage three times higher and has excellent characteristics of energy density per unit weight, and accordingly there is a trend of increase in use of lithium secondary batteries.

Herein, the lithium secondary battery signifies a lithium-based secondary battery such as a lithium ion battery, a lithium ion battery, a lithium high molecule battery, and a lithium polymer battery, and the lithium ion battery in the present invention will be described as an embodiment.

The lithium secondary batteries may be manufactured in various forms, and representative shapes include a cylinder type and a prismatic type that are mainly used for lithium ion batteries. Lithium polymer batteries, which have recently been spotlighted, are manufactured in a flexible pouched type for relatively free shapes.

The pouch-type lithium secondary battery has a structure in which a battery panel attached with a lead protruding to the outside is sealed in an aluminum pouch filled with electrolyte. In general, the lead is formed of a metal plate, such as aluminum or nickel-plated copper, an electrical good conductor. The aluminum pouch is a composite film composed of an aluminum foil with synthetic resin-based films on both sides thereof. There is a risk of electrolyte leakage from a site in which the lead is located in the aluminum pouch, since the metal plate and the synthetic resin material cannot easily adhere to each other.

In order to solve the above problem, the battery is manufactured by first fusing a lead film, which has the property of adhering well to both of the metal and the synthetic resin materials, to the lead and then placing the lead tab adhering to the lead film at an entrance of an aluminum pouch, and fusion-bonding the entrance using heat or the like.

In other words, the lead film is used when battery cells are packaged with the aluminum pouch to prevent leakage of electrolyte caused by occurrence of a sudden step difference due to the thickness of an electrode lead, and a lead film is attached to the battery lead tab before the pouch packaging process and compressed to an aluminum pouch. At this point, when the lead film is not completely compressed to the lead tab and a gap is generated, there is a risk of electrolyte leakage. Thus, it is necessary to inspect whether the lead film and the lead tab have a gap therebetween.

As demands for lithium-ion batteries are increased due to the increase in electric vehicles, the importance of a complete quality inspection related to the safety of the battery has been increasingly spotlighted. The pouch type batteries for electric vehicles are widely applied due to performance advantages compared to prismatic and cylindrical batteries, but have risks of performance degradation and fire due to defects in the battery manufacturing process. A lead film is interposed between a pouch and an electrode and compressed to the pouch to prevent leakage of electrolyte due to the gap between the pouch and the electrode.

As generally known, a lead film previously attached to a lead tab is used for compression between the pouch and the lead tab. At this point, since a gap at an adhesive interface between the lead tab and the lead film may also cause electrolyte leakage, inspection of the presence of the gap at the interface is very important.

So far, surface inspection has been mainly conducted through simple inspection with eyes or vision inspection with a camera. However, the above inspection approaches fail to detect the gap present inside. Alternatively, a section may be inspected, for example, by sampling but there is not a complete inspection approach.

Ultrasonic inspection may be applied to detect the presence of the gap, that is, the presence of pores or air layers in the lead film. However, it is difficult to apply an aerial ultrasonic inspection because accurate detection is impossible due to ultrasonic distortion due to film curvature and leakage of ultrasonic waves at both ends of a lead film having a width of about 10 mm only, and the detection resolution is low.

It is difficult to apply an ultrasonic immersion inspection because the inspection while immersing the electrode in a liquid is impossible due to the nature of the product and the detection accuracy is relatively low.

Meanwhile, conventionally proposed technologies are disclosed in the following Patent Document 1 to Patent Document 3 to inspect lithium-ion batteries.

Patent Document 1 discloses that a vision inspection is performed on an electrode body subject to a lamination process. Since the inspection is limited to a surface of an assembly between a lead film and a lead tab, a gap inside the lead film and the lead tab cannot be detected.

In addition, Patent Document 2 discloses that a secondary battery is manufactured by attaching the lead film containing a light emitting material to upper and lower surfaces of an electrode lead and then a state of a lead film is inspected with eyes through light irradiation. However, the adhesion state of the lead film may be checked, but the gap between the lead film and the lead tab cannot be confirmed.

In addition, Patent Document 3 discloses that infrared light is irradiated between a lead film and an electrode lead, but it is aimed at detecting microbubbles with a bubble size of 10 μm to 40 μm, so there is a limit in detecting other bubbles or gaps.

As in the above, Patent Document 1 to Patent Document 3 have a limit in detecting bubbles or gaps of predetermined sizes existing at the interface between the lead film and the lead tab, so it is necessary to derive a method capable of quickly and accurately detecting the presence of a gap.

(Patent Document 1) Korean Unexamined Patent Publication No. 10-2021-0009031 (Published on Jan. 26 2021) titled by "VISION INSPECTION APPARATUS FOR SECONDARY BATTERY"

(Patent Document 2) Korean Unexamined Patent Publication No. 10-2020-0017089 (Published on Feb. 18 2020) titled by "SECONDARY BATTERY COMPRISING LEAD FILM HAVING LIGHT EMITTING MATERIAL AND METHOD FOR DETECTING FAULT OF SECONDARY CELL"

(Patent Document 3) Korean Patent Registration No. 10-2000698 (Registered on Jul. 10 2019) titled by "APPARATUS FOR INSPECTING A BLOWHOLE OF LEAD-TAB"

SUMMARY OF THE INVENTION

Accordingly, the present invention is proposed in order to solve various problems occurring in the related art upon detecting the above-described gap between a lead film and a lead tab of a typical lithium secondary battery, and provides a device and a method for inspecting an air void at a lead film of a battery to simply and accurately perform total inspection of a gap (air void) between a lead film, which is attached to the lead tab to prevent a leakage of electrolyte in a pouch-type lithium-ion battery and insulate the electrolyte, and the lead tab boundary by using an optical coherence tomography (OCT).

The present invention further provides a device and a method for inspecting an air void at a lead film of a battery to enable total inspection during a mass production line instead of performing the recent sampling inspection by cutting the battery when inspecting a gap between the lead tab and the lead film.

To achieve the above-mentioned object "the device for inspecting an air void at a lead film of a battery" according to the present invention includes:
- a conveying device for conveying an object to be inspected in which the lead film is attached to a lead tab of an electrode assembly;
- a loader for loading the object conveyed through the conveying device to an inspection position;
- an alignment unit provided at the inspection position to align the object so that a focus is formed on an interface between the lead tab and the lead film of the object;
- an alignment confirmation unit for confirming an aligned state of the object aligned by the alignment unit;
- an OCT scanner for scanning the interface between the lead tab and the lead film above of the inspection position to obtain a gap inspection image between the lead tab and the lead film; and
- a gap determiner for analyzing the gap inspection image generated by the OCT scanner to determine fusion quality of the lead film.

When the alignment confirmation unit confirms that the object is not accurately aligned to the inspection position, the gap determiner controls the loader to move the object, so that an edge of the lead tab is aligned to the inspection position by the alignment unit.

The alignment confirmation unit
is configured to electrically connect two alignment plates constituting the alignment unit to confirm an aligned status of the object based on a presence of electricity when a current flows from one side and both ends of the lead tab simultaneously comes into contact with the alignment plate.

The OCT scanner may include
first and second OCT scanners for scanning left and right interfaces between the lead tab and the lead film of the object, respectively, to obtain gap inspection images between the lead tab and the lead film.

The gap determiner
searches for end points of the lead tab metal interface in the two gap inspection images obtained through the first and second OCT scanners, the image around the end point is recognized based on the found end point by signal analysis or pattern recognition of a spectrometer to calculate the size of the gap, and determines fusion quality of the lead film based on the calculated size of the gap.

The gap determiner may
determine the object as defective when a fusion defect of the lead film occurs based on at least one of the gap inspection images obtained through the first and second OCT scanners, control the loader to move the defective object to a defective product collection position, and convey only the object determined as a good fusion state of the lead film to a non-defective product collection position.

To achieve the above-mentioned object "the device for inspecting an air void at a lead film of a battery" according to the present invention includes:
(a) conveying, through a conveying device, an object to be inspected in which the lead film is attached to a lead tab of an electrode assembly;
(b) gripping the object conveyed through the conveying device to load the object to an inspection position;
(c) aligning the object such that a focus of an OCT scanner is formed on an interface between the lead tab and the lead film of the object;
(d) obtaining a gap inspection image between the lead tab and the lead film by scanning the interface between the lead tab and the lead film by using the OCT scanner above the inspection position; and
(e) analyzing the obtained gap inspection image by using a gap determination algorithm to determine fusion quality of the lead film.

Step (d) may include
scanning left and right interfaces between the lead tab and the lead film of the object, respectively, to obtain gap inspection images left and right interfaces between the lead tab and the lead film.

Step (e) may include
searching for end points of the interfaces in the obtained left and right gap inspection images, recognizing the image around the end point based on the found end point by signal analysis or pattern recognition of a spectrometer to calculate the size of the gap, and determining fusion quality of the lead film based on the calculated size of the gap.

Step (e) may include
determining the corresponding inspection object as defective when a fusion defect of the lead film is generated in at least one of gap inspection images of the left and right interfaces, and conveying the defective inspection object to the defective product collection position, and conveying only the object determined as a good fusion state of the lead film to a non-defective product collection position.

According to the present invention, the total inspection may be quickly and accurately conducted on the assembly between the lead tab and lead film before the mount on the battery cell, so that the deterioration of battery quality caused by leakage of electrolyte due to the gap present at the interface between the lead tab and the lead film caused by the defective fusion can be improved, and the cause of battery explosion can be prevented.

In addition, the position and size of the generated gap may be quantitatively analyzed to apply analysis information to the film fusion process, so that the fusion defects can be reduced.

DETAILED DESCRIPTION OF THE INVENTION

Hereinafter, a device and a method for inspecting an air void at a lead film of a battery according to a preferable embodiment of the present invention will be described with reference to the accompanying drawings.

The terms or words used in the present invention described below should not be construed as limited to a conventional or lexical meaning, and will be construed as the meanings and concepts based on the principle that "an inventor may define the concept of the term properly in order to describe the invention in the best way".

Accordingly, the embodiments described in the specification and the configurations shown in the drawings are merely exemplary embodiments according to the present invention, and may not represent all of the technical ideas of the present invention. Therefore, it will be understood that various equivalents and modifications may be substituted therefor at the time of filing of the present application.

Figure 1:
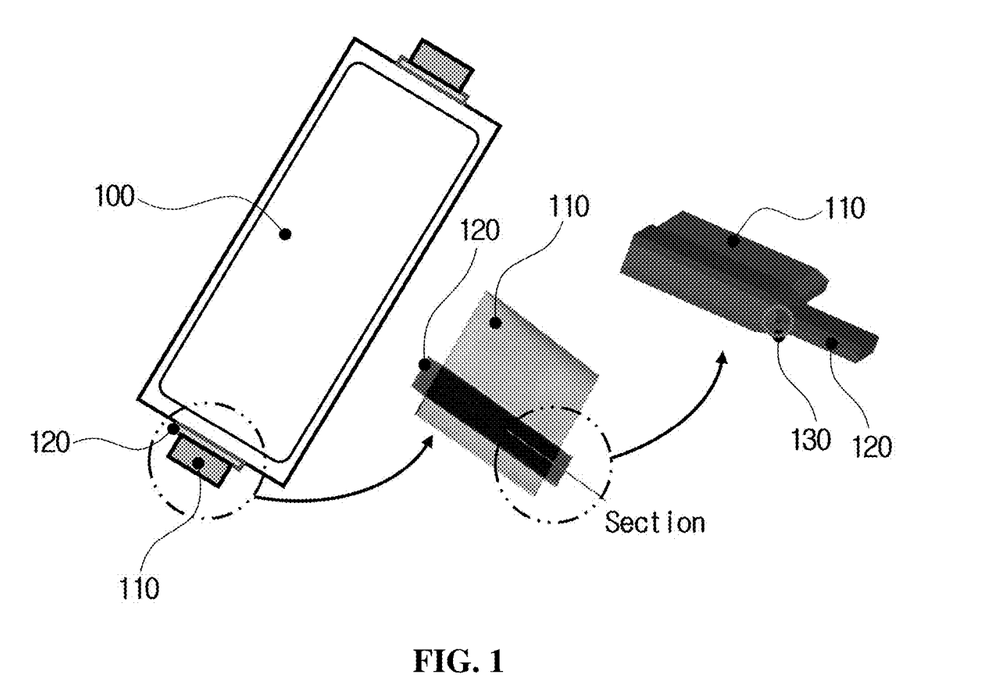
FIG. 1 is a schematic diagram showing a lead tab and a lead film of a typical pouch-type secondary battery as a target of a device for inspecting an air void at the lead film of the battery according to the present invention.

According to a typical form of a pouch-type secondary battery to which the present invention is applied, a lamination-type (stack-type) electrode assembly in which a positive electrode and a negative electrode cut in predetermined size units and a separator interposed therebetween are sequentially stacked as shown in FIG. 1, and a lead film 120 is attached to a positive lead tab 110 (or electrode tab) and a negative lead tab 110, and sealed to an aluminum pouch, thereby forming a battery cell (a pouch-type lithium-ion battery) 100.

At this point, when the lead film 120 is incompletely fused to the lead tab 110 and a pore or gap 130 occurs between the lead tab 110 and the lead film 120, there is a risk, such as performance degradation or explosion of the battery due to leakage of electrolyte. Accordingly, the lead tab with the lead film attached to the electrode assembly is required to be inspected before welding to prevent subsequent processing from proceeding, thereby preventing the battery cell failure.

Accordingly, the present invention applies an optical coherence tomography (OCT) inspection scheme, for displaying a detailed sectional image with several μm at a high speed for an object through which light passes to about 2 mm to 3 mm below the surface, to an interface of an opaque electrode and an interface of a translucent lead film, so as to detect the presence of a gap throughout the interfaces, so that a total inspection is performed before the assembly (the object to be inspected) formed by coupling the lead tab to the lead film is mounted to the battery cell.

The optical coherence tomography (OCT), which is mainly applied to retinal test in ophthalmology, is applied based on the fact that the lead film is a translucent material through which light passes, so that the presence of an air void at the interface between the electrode as an opaque metallic material formed of aluminum or copper and the translucent film can be detected.

The optical coherence tomography is configured to measure changes in light intensity due to light scattering from a microstructure of the object so as to indicate a two-dimensional or high-resolution image. Based on the principle, an incident beam is split into two parts by using a beam splitter, one for a sample beam irradiated to the object, and the other for a reference beam reflected from a mirror through the beam splitter at an angle of 90° reach a detector (photodetector), and accordingly a partial interference occurs between the two beams so that interference patterns are generated differently. Thus, the interference patterns are implemented as image by using a numerical analysis such as Fourier transform.

Figure 2:
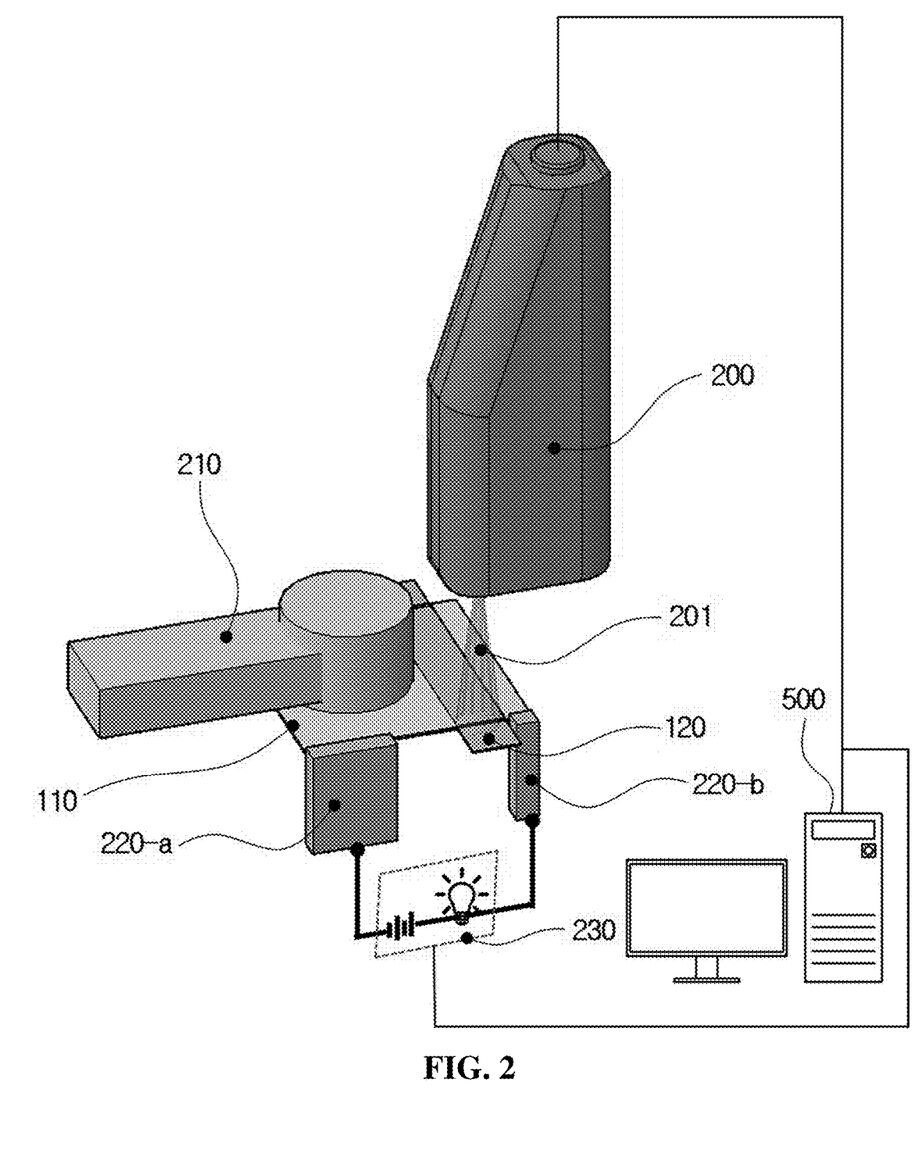
FIG. 2 is a schematic diagram showing the position of interface inspection with the device for inspecting an air void at a lead film of the battery, in which an OCT is applied according to the embodiment of the present invention.

FIG. 2 is a configuration diagram of a device for performing the OCT inspection on the lead film 120 attached to the lead tab 110. When the object as the assembly formed by fusing the lead tab with the lead film is moved, by a loader 210, on a conveyor as a conveying device to an inspection position in which an OCT scanner 200 is installed, an edge of the lead tab 110 is aligned by alignment units 220-*a* and 220-*b* so that a focal region of the OCT is formed on the interface between the lead tab 110 and the lead film 130. At this point, the aligned state is confirmed through an alignment confirmation unit 230 capable of checking the alignment based on the presence of electricity through the electrode tab 110 serving as a conductor by flowing a current to the one side 220-*a* and the other side 220-*b* of the alignment units 220-*a* and 220-*b*. Herein, the simple electricity checking device for checking the alignment can be easily implemented by those having basic knowledge of electricity. Thus, detailed description will be omitted. The alignment confirmation unit 230 may also visually display the aligned state, and may be connected to a gap determiner 500 through a signal line to generate an alignment state signal and transmit the signal to the gap determiner 500 although not shown in the drawing.

In addition, the loader 210 maintains the lead tab 110 at a predetermined position by an air adsorption scheme. When the alignment confirmation unit 230 checks that the alignment is not completed, the gap determiner 500 rotates the loader 210 toward the alignment units, so that the edges of the lead tab 110 are adjusted to match the alignment units. The suction force by the vacuum of the loader 210 is adjusted so as to allow the lead tab to be slightly slid for enabling the alignment.

Figure 3:
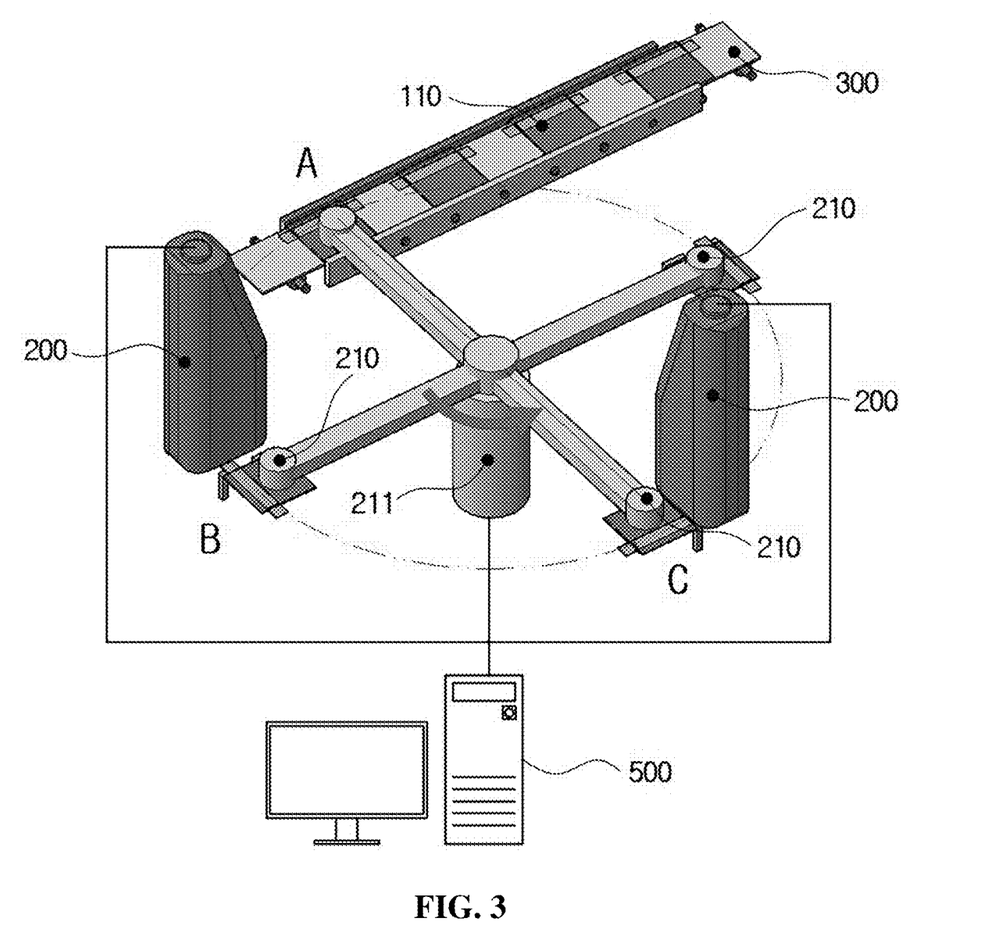
FIG. 3 is a schematic diagram of the inspection device to quickly inspect the presence of a gap at left/right interfaces during a mass production line according to the embodiment of the present invention.

In order to apply the above method in the mass production line, an automated device as shown in FIG. 3 may be configured to inspect each of left and right interfaces since there are two interface between the lead tab and the lead film on left and right sides.

Because the OCT scanner 200 has a short focal length, it is difficult to place the OCT scanners on left and right sides of the lead tab at the same time. Thus, a rotating mechanism 211 may be used as shown FIG. 3, the lead tab 110 at position A conveyed on the conveying device 300 is gripped by the loader 210 equipped with an air adsorber mounted to the rotating mechanism 211 at an interval of 90° and then loaded through rotation, a first interface (a left interface) to be inspected between the lead tab 110 and the lead film 120 is aligned with the focal length position of an OCT scanner 201 as a first OCT scanner, and a scan is performed (position B). The scanned gap inspection image of the first interface is transferred to the gap determiner 500.

The gap determiner 500 analyzes the scan result by using a gap determination algorithm, stops the adsorption function of the loader 210 when a gap is found, and drops the gripped object downward, so as to enable the defect screening immediately. A defect inspection object collection box for collecting the defect-inspected objects may be provided at a lower portion of the inspection position.

When the scan on the first interface is finished, the gap determiner 500 rotates the loader 210 by 90°, conveys the loader to position C, and scans a second interface (a right interface) in the same manner as above. The scanned gap inspection image of the second interface is transferred to the gap determiner 500.

The gap determiner 500 analyzes the scan result by using the gap determination algorithm described later, stops the adsorption function of the loader 210 when the result is determined as defective, and drops the gripped object downward, so as to enable the defect screening immediately. The loaders 210 rotated by the rotating mechanism 211 by every 90° may function independently for sequential inspection, so that the inspection time can be shortened.

In other words, when the first interface as a first inspection object is determined as defective upon inspection before both of the first and second interfaces of the lead tab are inspected, the lead tab is immediately treated as defect without inspection on the second interface, so that the inspection time can be shortened.

The determination between good and defective products by using the gap determination algorithm by OCT inspection is conducted as follows, which is a major part of the present invention.

Figure 4A:
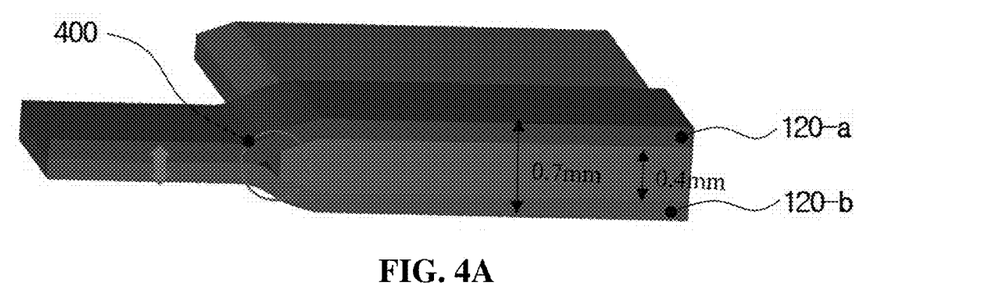
FIGS. 4A-4C are exemplary views of OCT images showing the presence or absence of a gap according to a fusion state at the interface between the lead tab and the lead film obtained from the embodiment of the present invention.
Figure 4B:
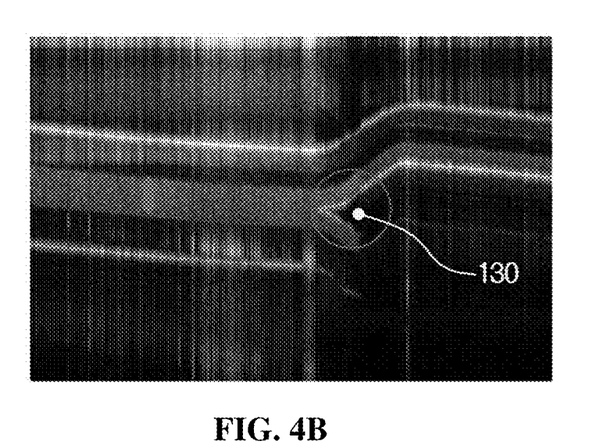
Figure 4C:
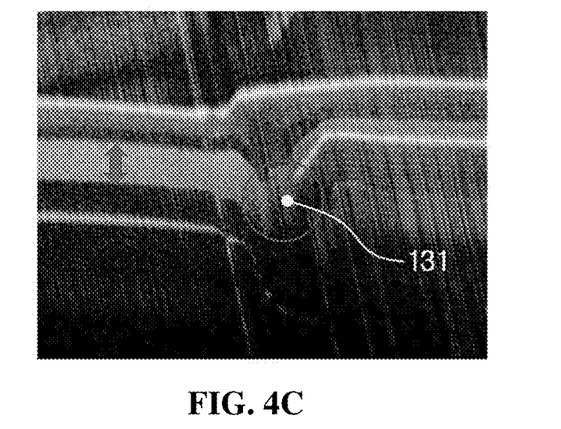

FIGS. 4A-4C illustrate OCT images, which are obtained by the embodiment of the present invention, with and without the defect, that is, the gap. The OCT images are tomography images of one section of the lead film, and the images may be obtained at intervals of several tens of μm throughout the entire width of the lead film on the interface to be inspected. For example, in order to obtain tomographic (sectional) images at 100 μm intervals for a lead film having a width of 10 mm, 100 images are obtained for the lead film width. When the obtained images are connected to each other, a three-dimensional image for the width of the lead film may be obtained. Since the width of the lead film is usually larger than the OCT scannable width, the OCT scan is performed while transferring the lead film.

In FIG. 4A, when the fusion between an upper lead film 120-a and a lower lead film 120-b on the lead tab is incomplete, and an interface 400 between the lead film 120 and the lead tab 110 has a gap of the lead film, a gap 130 is indicated in a sectional image as shown in FIG. 4B. When the upper and lower lead films are completely fused at the interface and there is no gap, the interface has a uniform grayscale, and accordingly an image having no gap 131 is displayed as shown in FIG. 4C. The gap in the above OCT-photographed image may be identified through the gap determination algorithm.

Since an actual OCT image may have a similar interference image caused by image noise and light, it is difficult to embody a program capable of determining the presence of a gap. The present invention uses the following algorithm capable of determining the presence of the gap, so as to enable rapid total inspection in a mass production line. It will be described in detail with reference to FIG. 5 as follows.

Figure 5:
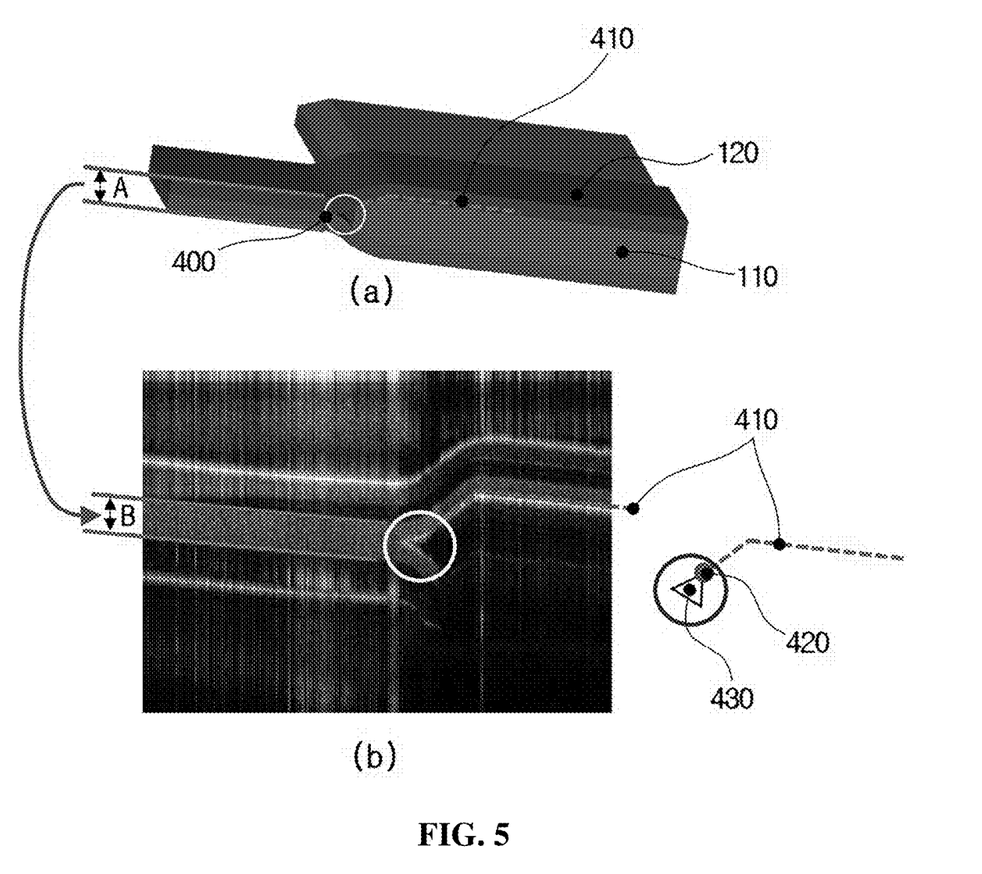
FIG. 5 is a schematic diagram showing a reference point for determining a gap image in a determination algorithm for calculating the presence and size of a gap in an OCT image in which image noise and interference exist according to the embodiment of the invention.

Because the OCT uses an optical interference phenomenon and accordingly an image of an opaque part through which light does not pass cannot be obtained, an interface 410 between the lead film 120 through which light passes and the lead tab 110 through which light does not pass is clearly distinguished, and an image in the vicinity based on an endpoint 420 of the interface is analyzed by using the gap determination algorithm, so that the quality of the fused part of the lead film can be determined. The endpoint of the interface may be found by extracting a portion in which color data on the interface 410 disappears in the photographed image.

The interface is indicated as an almost uniform grayscale when the fusion is normally conducted. However, when a gap is present, the gap is indicated as black and the interface of the gap is indicated as white, so that a size 430 of the gap may be obtained by using a technique such as pattern recognition.

Figure 6A:
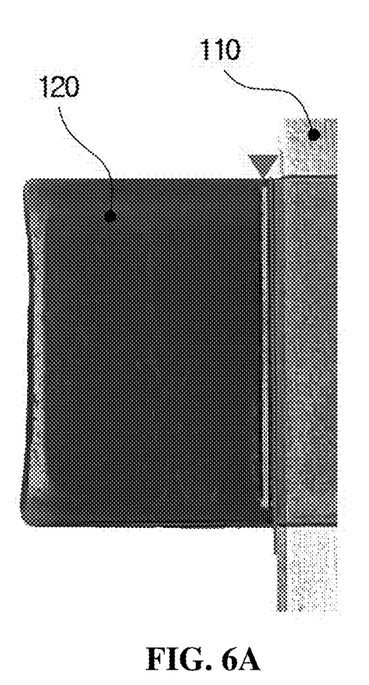
FIGS. 6A-6B are schematic diagrams showing the position and size of a gap at an interface calculated by the gap detection algorithm according to the embodiment of the present invention.
Figure 6B:
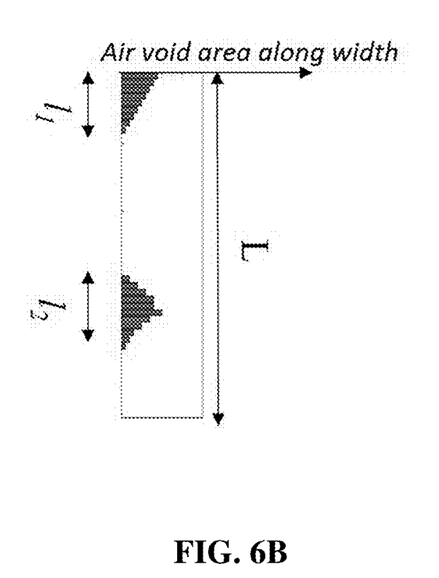

The size, that is, the area of the gap may be represented as in FIG. 6B when shown along the width of the lead film, which signifies the fusion quality of the lead film. Thus, the good and bad may be determined by using the size.

The above result may be fed back to the fusion process in addition to the quality determination on the lead film, thereby improving the fusion process, so that defects can be reduced. For example, information, such as the occurrence of defect in the first interface, the occurrence of defect in the second interface, the size of the gap in the interface, and the occurrence of defects on both of the first and second interfaces, may be fed back to the fusion process, so that the fusion process can be improved.

According to the method for feeding back the quality determination result of the lead film to the fusion process, the result of quality determination on the lead film may be provided to a terminal of an inspector, or the result of the quality determination may be expressed on a connected display, so that the lead film determination result can be fed back to the fusion process.

Figure 7:
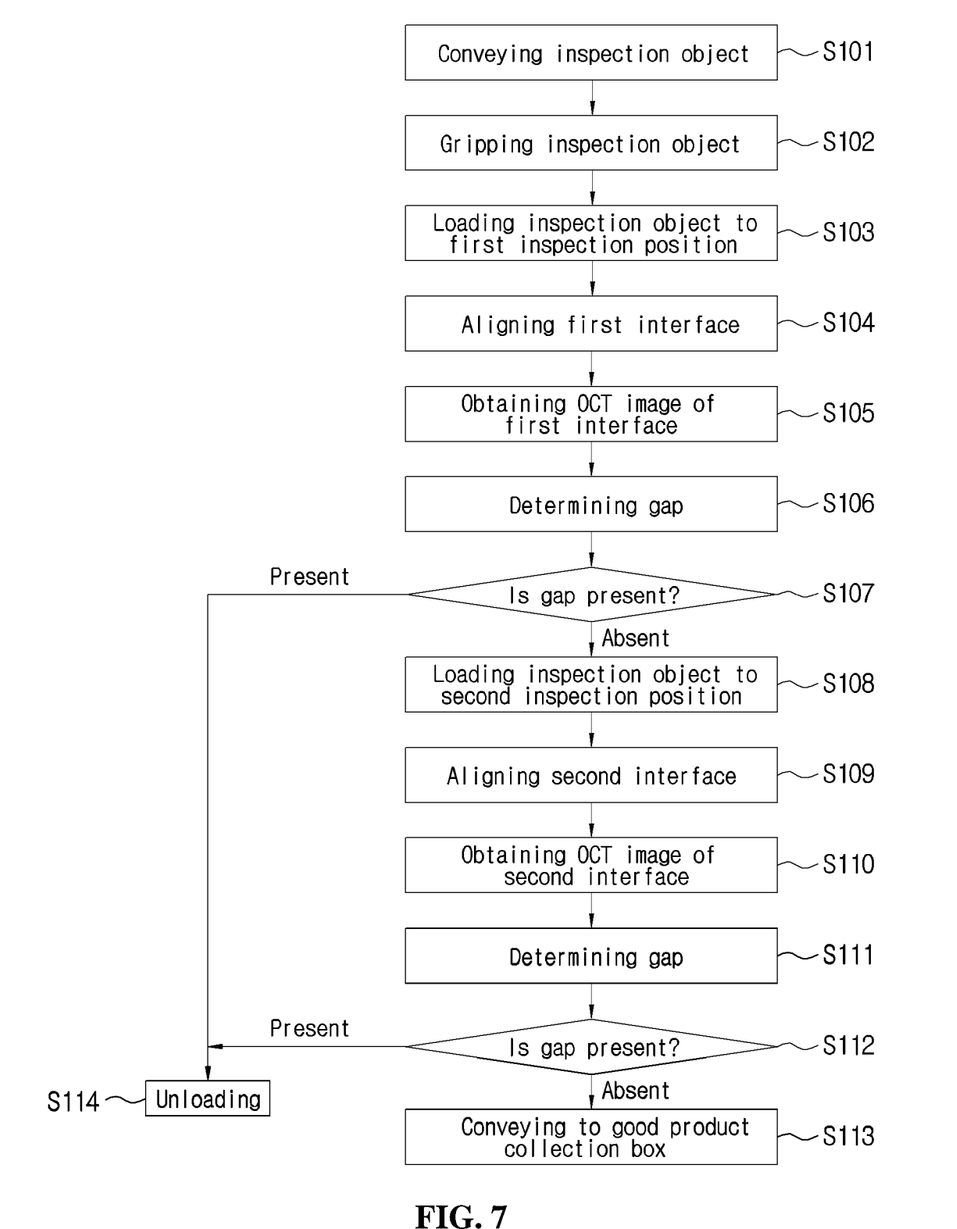
FIG. 7 is a flow chart showing a device for inspecting an air void at a lead film of a battery according to an exemplary embodiment of the present invention.

FIG. 7 is a flow chart showing "the device for inspecting an air void at a lead film of a battery" according to the present invention.

First, the inspection object, which is an assembly formed by attaching the lead film 120 to the lead tab 110 of the electrode assembly, is conveyed through a conveyor serving as the conveying device 300 (S101).

Next, the inspection object conveyed through the conveying device 300 is gripped using the air adsorption function of the loader 210 and loaded to the inspection position (S102 to S103).

Next, the inspection object is aligned so that a focus of the OCT scanner is formed on the first interface between the lead tab 110 and the lead film 120 of the inspection object (S104).

Next, the interface between the lead tab 110 and the lead film 120 is scanned by using the OCT scanner 200 above the inspection position, thereby obtaining a first gap inspection image between the lead tab 110 and the lead film 120 (S105).

Next, the obtained first gap inspection image is analyzed by the gap determination algorithm in the gap determiner 500, thereby determining the fusion quality of the lead film 120 (S106).

In other words, the gap determination algorithm is used to search for the end point of the interface in the obtained first gap inspection image, the image around the end point is recognized based on the found end point by signal analysis or pattern recognition of a spectrometer to calculate the size of the gap, and the quality of the fused lead film is determined based on the calculated size of the gap. A standard size for the size of the gap is set, and the calculated gap size is compared with the standard size, so that the quality of the fused lead film is determined based on the size.

Then, when the lead film has a defect in fusion based on a determining result on the fused quality of the lead film, the corresponding inspection object is determined as defective, and the defective inspection object is conveyed to the defective product collection position (S107 and S114). The defective inspection object is dropped directly downward from the actual current inspection position so as to be collected in the defect inspection object collection box disposed below the inspection position.

When the first interface is determined as normal, the inspection object is loaded and aligned, such that the OCT focus is formed on the second interface between the lead tab 110 and the lead film 120 of the gripped inspection object (S108 and S109).

Next, the interface between the lead tab 110 and the lead film 120 is scanned by using the OCT scanner 200 above the inspection position, thereby obtaining a second gap inspection image between the lead tab 110 and the lead film 120 (S110).

Next, the obtained second gap inspection image is analyzed using a gap determination algorithm in the gap determiner 500, thereby determining the fusion quality of the lead film 120 (S111).

In other words, the end point of the interface is searched for in the obtained second gap inspection image, the image around the end point is recognized based on the found end point by the pattern recognition to calculate the size of the gap, and the quality of the fused lead film is determined based on the calculated size of the gap. A standard size for the size of the gap is set, and the calculated gap size is compared with the standard size, so that the quality of the fused lead film is determined based on the size.

Then, when the lead film has a defect in fusion based on a determining result on the fused quality of the lead film, the corresponding inspection object is determined as defective, and the defective inspection object is conveyed to the defective product collection position (S112 and S114). The defective inspection object is dropped directly downward from the actual current inspection position so as to be collected in the defect inspection object collection box disposed below the inspection position.

On the contrary, when it is determined as good quality, the loader is controlled to convey the inspection object to a good product collection box, and the air adsorption is released to drop the inspection object into the good product collection box (S113).

Meanwhile, additionally in step S113, the quality determination result of the lead film may be fed back to the fusion process, so that the occurrence of defective products may be reduced in the lead film fusion process. In other words, the result of quality determination on the lead film may be provided to a terminal of an inspector, or the result of the quality determination may be expressed on a connected display, so that the lead film determination result can be fed back to the fusion process.

According to the present invention as described above, the total inspection may be quickly and accurately conducted on the assembly between the lead tab and lead film before the mount on the battery cell, so that the deterioration of battery quality caused by leakage of electrolyte due to the gap present at the interface between the lead tab and the lead film caused by the defective fusion can be improved, and the cause of battery explosion can be prevented.

In addition, the position and size of the generated gap may be quantitatively analyzed to apply analysis information to the film fusion process, so that the fusion defects can be reduced.

The present implemented by the inventor is described in detail according to the above embodiments, however, it will be appreciated by those skilled in the art that the present invention is not limited to the described embodiments and various modifications may be made to those embodiments without departing from the spirit of the invention.

What is claimed is:

1. A device for inspecting a gap at a lead film of a battery, the device comprising:
   a conveying device for conveying an object to be inspected in which the lead film is attached to a lead tab;
   a loader for loading the object conveyed through the conveying device to an inspection position;
   an alignment unit provided at the inspection position to align the object, so that a focus is formed on an interface between the lead tab and the lead film of the object;
   an alignment confirmation unit for confirming an aligned state of the object aligned by the alignment unit;
   an OCT scanner for scanning the interface between the lead tab and the lead film above of the inspection position to obtain a gap inspection image between the lead tab and the lead film; and
   a gap determiner for analyzing the gap inspection image generated in the OCT scanner based on a gap determination algorithm to determine fusion quality of the lead film.

2. The device of claim 1, wherein the alignment confirmation unit is configured to electrically connect two alignment plates constituting the alignment unit to confirm an aligned status of the object based on a presence of electricity when a current flows from one side and both ends of the lead tab simultaneously comes into contact with the alignment plate.

3. The device of claim 1, wherein the OCT scanner includes first and second OCT scanners for scan first and second interfaces that are left and right interfaces between the lead tab and the lead film of the object, respectively, to obtain gap inspection images between the lead tab and the lead film.

4. The device of claim 1, wherein the gap determiner searches for end points of the lead tab metal interface in the two gap inspection images obtained through the first and second OCT scanners, recognizes an image around the end point based on the found end point by signal analysis or pattern recognition of a spectrometer to calculate a size of the gap, and determines fusion quality of the lead film based on the calculated size of the gap.

5. The device of claim 1, wherein the gap determiner is configured to determine the object as defective when a fusion defect of the lead film occurs based on at least one of the gap inspection images obtained through the first and second OCT scanners, control the loader to move the defective object to a defective product collection box, and convey only the object determined as a good fusion state of the lead film to a non-defective product collection box.

6. A method for inspecting a gap at a lead film of a battery by using a device for inspecting a gap at a lead film of a battery according to claim 1, the method comprising:

(a) conveying, through a conveying device, an object to be inspected in which the lead film is attached to a lead tab;
(b) gripping the object conveyed through the conveying device to load the object to an inspection position;
(c) aligning the object such that a focus of an OCT scanner is formed on an interface between the lead tab and the lead film of the object;
(d) obtaining a gap inspection image between the lead tab and the lead film by scanning the interface between the lead tab and the lead film by using the OCT scanner above the inspection position; and
(e) analyzing the obtained gap inspection image by using a gap determination algorithm to determine fusion quality of the lead film.

7. The method of claim 6, wherein step (e) includes:
searching for end points of the interfaces in the obtained first gap inspection images;
the image around the end point is recognized based on the found end point by signal analysis or pattern recognition of a spectrometer to calculate the size of the gap; and
determines fusion quality of the lead film based on the calculated size of the gap.

8. The method of claim 6, wherein step (e) includes:
feeding back the quality determination result of the lead film to the fusion process, so that defective products are reduced in a lead film fusion process.

* * * * *